July 31, 1923.

J. H. MINER 1,463,480

SAW TOOTH

Filed Nov. 21, 1921

Inventor:
James H. Miner,
by Spear Middleton Donaldson Hall
Attys.

Patented July 31, 1923.

1,463,480

UNITED STATES PATENT OFFICE.

JAMES H. MINER, OF MERIDIAN, MISSISSIPPI.

SAW TOOTH.

Application filed November 21, 1921. Serial No. 516,647.

*To all whom it may concern:*

Be it known that I, JAMES H. MINER, a citizen of the United States, and resident of Meridian, in the county of Lauderdale, in the State of Mississippi, have invented certain new and useful Improvements in Saw Teeth, of which the following is a specification.

My present invention relates to improvements in insertible teeth for saws. The invention aims to provide a construction which will have a progressive tightening effect as the tooth is drawn down into the recess in the saw blade by the action of the holder.

The invention further aims to provide a construction which will protect the ball of the shank or holder from wear and erosion.

With these and other objects in view the invention includes the novel feature of construction and arrangements and in combination of parts hereinafter described, the invention being defined by the appended claims.

My said invention is illustrated in the accompanying drawing, in which—

Figure 1:
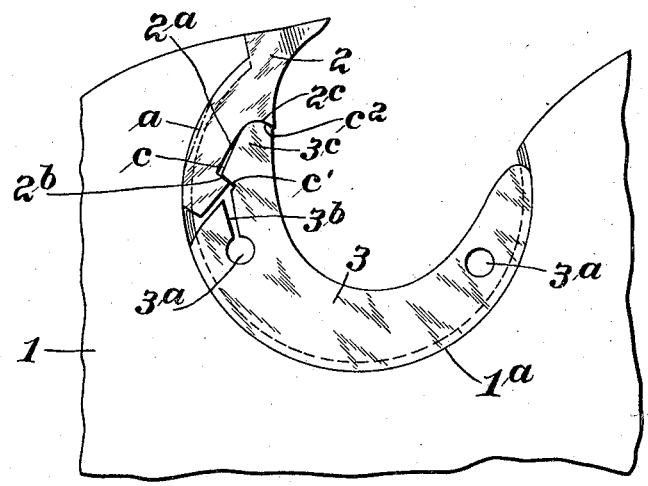
Figure 2:
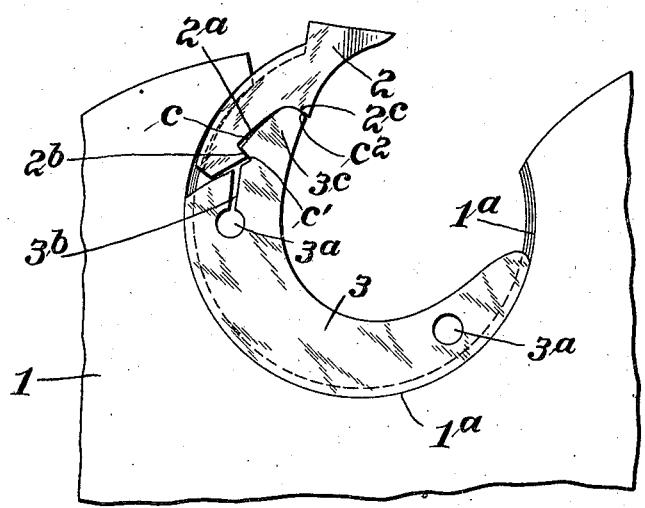

Figure 1 is a plan view of a portion of a saw blade showing my improved tooth in place; and Fig. 2 is a similar view showing the tooth entered in the saw recess, but not turned or drawn down into final position.

Referring by reference characters to this drawing, the numeral 1 designates the saw blade, 2 the tooth portion of the insertible tooth, and 3, the holder or device by which the tooth is drawn down into the recess $1^a$ in the saw and held locked in cutting position.

These recesses, such as $1^a$, are, as is well known, of semi-circular formation and provided with wedge shape or convex edges which engage correspondingly shaped grooves in the exterior curved face of the tooth portion and holder. The tooth portion is provided with a recess in its inner edge which has a substantially straight wall $2^a$ which is arranged at an incline to the chord of the diametrically opposed portion of the circle, such chord being indicated by dotted line $a$. This recess terminates at its inner end, or end which is remote from the cutting point of the tooth, in an abrupt shoulder $2^b$ and at its other end in a rounded or concave shoulder $2^c$. The holder 3, which is provided with the usual eyes or openings $3^a$ for the insertion of the tool used for drawing the holder and tooth portion into place and which is also split as indicated at $3^b$ to give the customary resiliency to the head of the holder, is provided with a head $3^c$ for engaging the tooth portion, which head has a face $c$ which is substantially straight and of a length substantially the same as the wall $2^a$. At its inner end the straight face terminates in an abrupt shoulder $c'$ designed to cooperate with the shoulder $2^b$ and at its outer end terminates in a rounded shoulder or end $c^2$ which cooperates with the concave shoulder $2^c$. In effect the shoulder $c'$ is formed by a recess in the holder, and the shoulder $2^b$ on the tooth forms a corresponding projection at the extreme inner end of the tooth portion, but the exact shape of the extreme inner end of the tooth and the corresponding portion of the holder is not material as long as the abrupt cooperating shoulders, $2^b$ and $c'$, are secured. The relative shape and arrangement of parts is such that in entering the insertible tooth in the saw recess, as shown in Fig. 2, the straight walls $2^a$ and $c$ closely approach or contact with each other, and the tooth is easily inserted in position. As the holder is turned in a counter-clockwise direction the tooth portion is drawn into the saw recess by the action of the cooperating abrupt shoulders $2^b$ and $c'$, while at the same time the rounded ball or nose $c^2$ acts as a wedging fulcrum and tightens as the tooth portion goes down into the socket until finally, when the tooth is in place as shown in Fig. 1 the straight portions $2^a$ and $c$ of the tooth portion and holder lie at an angle to each other as shown in Fig. 1, the separation of their inner ends having gradually taken place as the tooth is drawn into position.

In the use of insertible and removable saw teeth, the tooth portion wears much more rapidly than the holder and the only portion of the holder which is subjected to any material wear is the portion immediately adjoining the tooth at the inner edge, such action being due to the wear or erosion resulting from saw dust and the like at the joint. In order to prolong the life of the holder, I extend the shoulder $2^c$ beyond the inner edge of the holder so that the saw dust is projected clear of the edge of the holder and by the time this projecting portion is worn down the cutting portion of the tooth is worn so as to require replacement of the tooth portion.

A tooth such as hereinbefore described, can be entered easily and has its initial movement with comparatively little frictional engagement, while at the latter part of the movement the necessary wedging action is secured to effect the firm holding of the tooth. This is due to the peculiar shape of applicant's shoulders and straight walls. Referring to Figure 2 of the drawings, where the tooth is shown in the act of being entered, it will be seen that the rounded projection $c^2$ lies in such a position that it does not exert any wedging action. The difference in angularity between the walls $2^a$ and $c$ permits the inner end of the tooth to lie in such position that its outer curved wall is out of contact with, or does not frictionally engage, the wall of the recess of the saw, while the abrupt coacting shoulders $c'$ and $2^b$ exert a direct pulling effect on the tooth without any tendency to crowd it towards the wall of the saw recess. This enables the initial turning movement of the holder to be made with comparative ease, or, in other words, very much less force is required than is necessary to finally seat the tooth. It is only after the tooth has neared its final position that the curved shoulders $c^2$ and $2^c$ coact to produce the wedging action, and even then their sole function is to secure the wedging action, the drawing strain still being carried by the abrupt shoulders $c'$ and $2^b$, the space between the two straight walls widening slightly by the relative slight movement of the shoulders $c'$ and $2^b$ as the tooth is forced to final position.

Having thus described my invention, what I claim is:

1. An insertible saw tooth for use in saw blades having substantially semi-circular tooth receiving recesses, comprising a tooth portion provided with a recess in its lower edge having a substantially straight wall, said recess terminating in a curved shoulder at its outer end and an abrupt shoulder at its inner end, said tooth having an arc-shaped outer edge to fit the tooth receiving recess which arc-shaped edge terminates in an outer shoulder, and an arc-shaped holder having a projection at its outer end to cooperate with said curved shoulder, and an inwardly facing abrupt shoulder to cooperate with the abrupt shoulder on the tooth, said projection being a rounded shoulder on which the curved shoulder of the tooth may rock and the abrupt shoulders being so shaped that the lower or inner end of the tooth may approach the holder during the preliminary insertion, the outer shoulder of the tooth causing it to rock back when fully inserted.

2. An insertible saw tooth for use in saw blades having substantially semi-circular tooth receiving recesses comprising a tooth portion provided with a recess in its inner edge having a substantially straight wall which is inclined to the chord of the corresponding curved face of the tooth, said recess terminating in an abrupt shoulder at its inner end and a convex shoulder at its outer end, and an arc shaped holder having a projection provided with a corresponding substantially straight wall which is arranged at a slightly different angle to said chord, said projection having an abrupt shoulder to coact with the abrupt shoulder on the tooth and a rounded nose to coact with the convex shoulder on the tooth.

3. An insertible saw tooth for use in saw blades having substantially semi-circular tooth receiving recesses comprising a tooth portion provided with a recess in its inner edge having a substantially straight wall which is inclined to the chord of the corresponding curved face of the tooth, said recess terminating in a rounded shoulder at its outer end, and at its inner end in a shoulder substantially perpendicular to said wall and an arc shaped holder having a projection to cooperate with said recess, said projection having an outer rounded end, an inner abrupt shoulder and a straight connecting face, said straight face being positioned at an angle relative to the chord which is slightly different from the angular relation of the said straight wall of the tooth, and the face of said inner shoulder of the holder being substantially perpendicular to the said straight wall of the holder.

In testimony whereof I affix my signature.

JAMES H. MINER.